United States Patent
Bennett

(10) Patent No.: US 8,914,466 B2
(45) Date of Patent: Dec. 16, 2014

(54) MULTI-LEVEL ADAPTIVE CACHING WITHIN ASSET-BASED WEB SYSTEMS

(75) Inventor: Jonathan D. Bennett, Markham (CA)

(73) Assignee: International Business Machines Corporation, Armonk, NY (US)

(*) Notice: Subject to any disclaimer, the term of this patent is extended or adjusted under 35 U.S.C. 154(b) by 557 days.

(21) Appl. No.: 13/178,130

(22) Filed: Jul. 7, 2011

(65) Prior Publication Data

US 2013/0013729 A1 Jan. 10, 2013

(51) Int. Cl.
- G06F 15/16 (2006.01)
- G06F 17/30 (2006.01)
- H04L 29/08 (2006.01)

(52) U.S. Cl.
CPC ...... *G06F 17/30902* (2013.01); *H04L 67/2842* (2013.01); *H04L 67/2876* (2013.01); *H04L 67/2857* (2013.01)
USPC .......................................... 709/217; 711/118

(58) Field of Classification Search
None
See application file for complete search history.

(56) References Cited

U.S. PATENT DOCUMENTS

| | | | | |
|---|---|---|---|---|
| 5,781,757 A * | 7/1998 | Deshpande | ............... | 711/146 |
| 6,757,787 B2 * | 6/2004 | Shen et al. | ............... | 711/141 |
| 6,883,070 B2 * | 4/2005 | Martin et al. | ............... | 711/141 |
| 7,146,429 B2 * | 12/2006 | Michel | ............... | 709/238 |
| 7,403,992 B2 * | 7/2008 | Tilander et al. | ............... | 709/224 |
| 7,437,509 B2 * | 10/2008 | Vayssiere | ............... | 711/118 |
| 7,555,561 B2 * | 6/2009 | Michel | ............... | 709/238 |
| 7,689,660 B2 | 3/2010 | Kilian et al. | | |
| 7,716,377 B2 | 5/2010 | Harris et al. | | |
| 7,734,823 B2 | 6/2010 | Tsimelzon et al. | | |
| 7,818,391 B2 * | 10/2010 | Van Doren et al. | ............... | 709/217 |
| 7,831,634 B2 | 11/2010 | Petev et al. | | |
| 2002/0143984 A1 * | 10/2002 | Hudson Michel | ............... | 709/238 |
| 2003/0074531 A1 * | 4/2003 | Forrer, Jr. | ............... | 711/118 |
| 2003/0195941 A1 * | 10/2003 | Amiri et al. | ............... | 709/214 |
| 2004/0068619 A1 * | 4/2004 | Van Doren | ............... | 711/144 |
| 2004/0205340 A1 * | 10/2004 | Shimbo et al. | ............... | 713/165 |
| 2005/0198440 A1 * | 9/2005 | Van Doren et al. | ............... | 711/141 |
| 2006/0069715 A1 * | 3/2006 | Vayssiere | ............... | 709/203 |
| 2006/0129627 A1 * | 6/2006 | Phillips et al. | ............... | 709/200 |
| 2006/0236048 A1 * | 10/2006 | Deguchi et al. | ............... | 711/162 |
| 2010/0146122 A1 * | 6/2010 | Prince et al. | ............... | 709/226 |
| 2010/0191805 A1 | 7/2010 | Lu et al. | | |
| 2010/0281222 A1 * | 11/2010 | Liu et al. | ............... | 711/133 |
| 2010/0325367 A1 * | 12/2010 | Kornegay et al. | ............... | 711/143 |
| 2012/0239859 A1 * | 9/2012 | Lary et al. | ............... | 711/103 |
| 2013/0166848 A1 * | 6/2013 | Miyazaki et al. | ............... | 711/143 |

OTHER PUBLICATIONS

David Carrera, et al., Utility-based Placement of Dynamic Web Applications with Fairness Goals, Symposium Paper: 2008 Network Operations and Management Symposium (NOMS), Apr. 7-11, 2008, pp. 9-16 (plus 1 citation page added), IEEE, Published on the World Wide Web.

* cited by examiner

*Primary Examiner* — Ninos Donabed
(74) *Attorney, Agent, or Firm* — Lee Law, PLLC; Christopher B. Lee

(57) ABSTRACT

A server monitors receipt of application access requests for application asset data from client devices. Each client device includes a local cache and the server includes a back-end cache. In response to receipt of each application access request, a number of client devices requesting access to the application asset data and an access privilege type requested by each requesting client device are determined. The application asset data is migrated between the back-end cache and at least one local cache based upon the determined number of client devices requesting access to the application asset data and the access privilege type requested by each requesting client device.

24 Claims, 7 Drawing Sheets

400

US 8,914,466 B2

MULTI-LEVEL ADAPTIVE CACHING WITHIN ASSET-BASED WEB SYSTEMS

BACKGROUND

The present invention relates to cache systems. More particularly, the present invention relates to multi-level adaptive caching within asset-based web systems.

Cache memories operate to store data. Cache memories may be loaded with data from a permanent storage device. Devices may access data stored within the cache memories or within the permanent storage device based upon access to a suitable connection to the respective storage device.

BRIEF SUMMARY

A method includes monitoring, via a server comprising a back-end cache, received application access requests for application asset data from client devices that each comprise a local cache; determining, in response to each received application access request, a number of the client devices requesting access to the application asset data and an access privilege type requested by each requesting client device; and migrating the application asset data between the back-end cache and at least one local cache based upon the determined number of client devices requesting access to the application asset data and the access privilege type requested by each requesting client device.

A server apparatus includes a back-end cache and a processor programmed to monitor received application access requests for application asset data from client devices that each comprise a local cache; determine, in response to each received application access request, a number of the client devices requesting access to the application asset data and an access privilege type requested by each requesting client device; and migrate the application asset data between the back-end cache and at least one local cache based upon the determined number of client devices requesting access to the application asset data and the access privilege type requested by each requesting client device.

A computer program product includes a computer readable storage medium including computer readable program code, where the computer readable program code when executed on a computer causes the computer to monitor, via a server comprising a back-end cache, received application access requests for application asset data from client devices that each comprise a local cache; determine, in response to each received application access request, a number of the client devices requesting access to the application asset data and an access privilege type requested by each requesting client device; and migrate the application asset data between the back-end cache and at least one local cache based upon the determined number of client devices requesting access to the application asset data and the access privilege type requested by each requesting client device.

DETAILED DESCRIPTION

Figure 1:
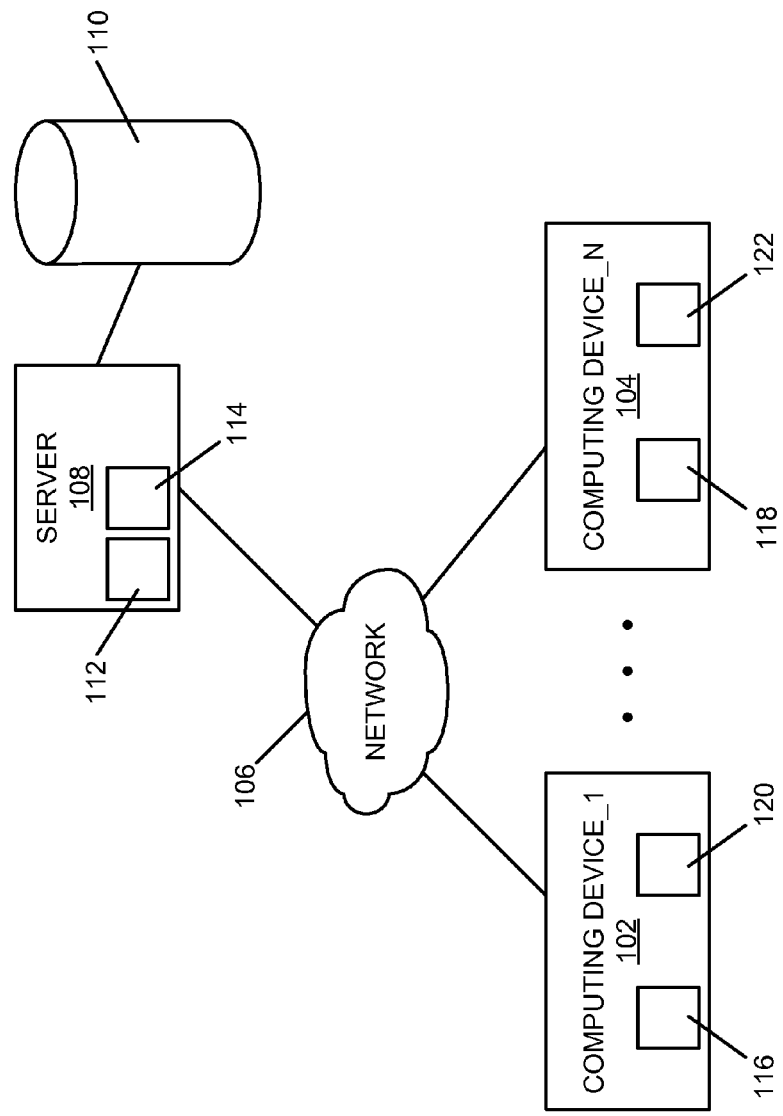
FIG. 1 is a block diagram of an example of an implementation of a system for multi-level adaptive caching within asset-based web systems according to an embodiment of the present subject matter.

The examples set forth below represent the necessary information to enable those skilled in the art to practice the invention and illustrate the best mode of practicing the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

The subject matter described herein provides multi-level adaptive caching within asset-based web systems. The present subject matter takes into consideration topology and location of available cache devices relative to user accesses to data and other assets. Assets and data, such as documents that may be shared between multiple users, may be accessed from geographically-distributed locations. The present subject matter operates to migrate cached assets to a cache that offers the least network latency. The present subject matter allows individual application instances to maintain private caches of asset data for high performance, while accessing shared or lower priority information via a common caching layer, such as a cache located at a server device.

For purposes of the present subject matter, the terms "asset," "asset data," and "application data," and "application asset data" may be used interchangeably and may be considered data produced by, edited by, and/or used by an application when the application is executed by a computing device. Further, asset-based web systems may be considered "horizontally-scaled application topologies." Horizontally-scaled application topologies results when multiple applications and/or application servers rely on the same data, but are physically distributed geographically. Physical geographic distribution may result when multiple application server instances are operated from different computing devices located in different offices, different cities, different time zones, different countries, etc. For example, a single data set (e.g., document, file, etc.) may be accessed by multiple client devices from different locations, at different times of day, and the data may be accessed concurrently from different locations. As described in more detail below, the present subject matter manages these data accesses to facilitate read and/or write access, as appropriate for the given access scenario at a given point in time. As such, for purposes of the present subject matter, any such system may be suitable for implementation of the present subject matter and any such system is considered within the scope of the present subject matter.

Horizontally-scaled applications may conceptually be broken into three pieces. A data store (e.g., a relational database), a back-end cache that resides in the same data center as the data store and that controls access to the data store, and one or more application instances that may be executed from arbitrary locations that are geographically distributed from the data store. The present subject matter operates to provide an efficient caching system that reduces requests from the back-end cache to the data store, and that increases the amount of asset record data moved from the back-end cache to the correct application instance.

The present subject matter provides a back-end cache system configured as a controller for distribution of assets for viewing and editing. The back-end cache controller system includes at least two sets of cache data: a most recently used (MRU) cache for asset data, and asset ownership information (e.g., stored as a look-up table or other structure) that keeps track of which application instances are reading and/or modifying a given asset. If the server back-end cache management (e.g., controller layer/level) detects that multiple application instances are attempting to concurrently modify the same asset, then the asset record is moved to the back-end cache controller system and updates are executed and controlled in that single location. Alternatively, if a single application instance is interested in an asset, then the asset data is moved to the application instance to reduce network latency for accesses and updates to the asset.

As such, the back-end cache controller system may efficiently detect which systems are interested in a given asset and move the asset record to the interested application, when possible, and/or move the asset record to the back-end cache controller system when multiple application instances are interested in the asset. This process of moving the asset data around the distributed system is referred to herein as "migrating" the asset data. Migration of asset data may also be considered migration of "ownership" of the asset data for edits and modifications for the duration of any given migration. Accordingly, ownership and asset data are dynamically continuously migrated to be located within a cache with the least network latency for the client application instances that are using the asset in view of the number of client devices and access types (e.g., read access, write access, etc.), while preserving the ability to move to the ownership and asset data to other systems (e.g., other application instances or to the back-end cache controller system) as new users and application instances reference the asset data. The asset data may be migrated to client devices that are accessing the asset data for read-only operations or where only one client device is accessing the asset data to remove network latency for data accesses.

The multi-level adaptive caching within asset-based web systems described herein exposes three operations that are used during regular program execution. A first operation includes a "Request" operation which is used by client applications, to request information about an asset (e.g., asset data) from the common cache area (e.g., back-end cache). A second operation includes an "Update" operation, which is used by application instances when the application changes the contents (e.g., asset data) of an asset. A third operation includes a "Migrate" operation, which is controlled by the back-end cache controller system, and which is used to move asset records between an edge node (e.g., system that executes an application instance) and the back-end cache controller system.

These operations may be combined into a single request message to the back-end cache management and controller layer/level of the back-end cache controller system. The controller level analyzes the incoming request and determines whether the request results in an asset record being used by multiple client devices, which results in the asset data being migrated to the back-end cache controller system. Alternatively, if the asset access request may be localized to a single client device, the asset data may either remain at or be migrated to the single client device. An individual request from a single client device results in the asset record being migrated to the client to eliminate network latency.

It should be noted that conception of the present subject matter resulted from recognition of certain limitations associated with network latency for distributed application accesses to asset data. For example, the present subject matter improves asset data access by multiple devices by providing for migration of asset data to client devices where only a single device is accessing the asset for write operations, and migrating the asset data to the back-end cache controller system where multiple devices are accessing the asset for write operations, as described above and in more detail below. As such, improved asset data management may be obtained through centralized control of asset data distribution and migration across geographically distributed locations.

The multi-level adaptive caching within asset-based web systems described herein may be performed in real time to allow prompt retrieval of data and assets by migrating data access to a cache that offers the least (or no) network latency based upon available infrastructure. For purposes of the present description, real time shall include any time frame of sufficiently short duration as to provide reasonable response time for information processing acceptable to a user of the subject matter described. Additionally, the term "real time" shall include what is commonly termed "near real time"—generally meaning any time frame of sufficiently short duration as to provide reasonable response time for on-demand information processing acceptable to a user of the subject matter described (e.g., within a portion of a second or within a few seconds). These terms, while difficult to precisely define are well understood by those skilled in the art.

FIG. 1 is a block diagram of an example of an implementation of a system 100 for multi-level adaptive caching within asset-based web systems. A computing device_1 102 through a computing device_N 104 communicate via a network 106 with a server 108. The computing devices 102 through 104 may be geographically distributed and located at physically different locations, both relative to one another and relative to the server 108. The server 108 may be considered a back-end cache controller system for purposes of the present description. The computing device_1 102 through the computing device_N 104 may be considered client devices that execute application instances.

The server 108 interfaces with a database 110 that operates as a longer-term asset store to store asset data for access by the computing device_1 102 through the computing device_N 104. Either before any asset access request or in response to at least one asset request by any of the computing devices 102 through 104, asset data from the database 110 may be initially cached within a back-end cache 112 and ownership may be assigned by default to the server 108 within an asset migration tracking storage area 114.

Regarding asset requests, where only one of the computing devices 102 through 104 has requested access to the asset or where multiple client devices have requested read-only access, asset data for the asset may be migrated from the back-end cache 112 to the respective client devices and stored within a cache 116 through a cache 118, respectively, depending upon which of the computing devices 102 through 104 requested the asset access. In such a situation, ownership of the asset may be considered to remain with the server 108 because no client device is attempting to modify the asset. Each of the computing devices 102 through 104 may track its assigned ownership/migration status within an asset migration tracking storage area 120 through 122, respectively. For purposes of the present description, the cache 116 through the cache 118 may be considered and referenced as "local" caches or cache devices of the respective computing devices 102 through 104.

In response to any client device requesting to modify the asset data for the asset, the server 108 makes a determination based upon any current distribution of asset data as to whether to further migrate the asset data. For example, for an initial access request that includes an indication that the asset data will be modified and no other client device is currently accessing the asset, the asset may be migrated to the requesting client device and ownership may be assigned to that client device. Alternatively, for a situation where multiple client devices request modification authority for the asset data, the asset data may either remain in the back-end cache 112 if the multiple requests are received contemporaneously or may be migrated from one or more of the computing devices 102 through 104 to the back-end cache 112. For purposes of the present description, the back-end cache 112 may be considered and referenced herein interchangeably as a "system-level cache." As another alternative, where multiple client devices previously requested read-only access and the asset data was distributed to reduce network latency, but ownership was retained by the server 108, the server 108 may instruct the respective client devices to invalidate the asset data within the local cache of the respective client devices rather than migrate the data back to the server because the asset data may already be stored within the back-end cache 112 or may be retrieved unmodified from the database 110. Many other variations are possible and all are considered within the scope of the present subject matter.

As will be described in more detail below in association with FIG. 2 through FIG. 5C, the server 108 provides automated multi-level adaptive caching within asset-based web systems. The automated multi-level adaptive caching within asset-based web systems is based upon determinations of asset access by multiple client devices.

It should be noted that the computing device_1 102 through the computing device_N 104 may be a portable computing device, either by a user's ability to move the respective computing device to different locations, or by the respective computing device's association with a portable platform, such as a plane, train, automobile, or other moving vehicle. It should also be noted that the server 108 and the computing device_1 102 through the computing device_N 104 may be any computing device capable of processing information as described above and in more detail below. For example, the respective devices may include devices such as a personal computer (e.g., desktop, laptop, etc.) or a handheld device (e.g., cellular telephone, personal digital assistant (PDA), email device, music recording or playback device, etc.), or any other device capable of processing information as described in more detail below.

The network 106 may include any form of interconnection suitable for the intended purpose, including a private or public network such as an intranet or the Internet, respectively, direct inter-module interconnection, dial-up, wireless, or any other interconnection mechanism capable of interconnecting the respective devices. The database 110 may include any device capable of storing asset data.

Figure 2:
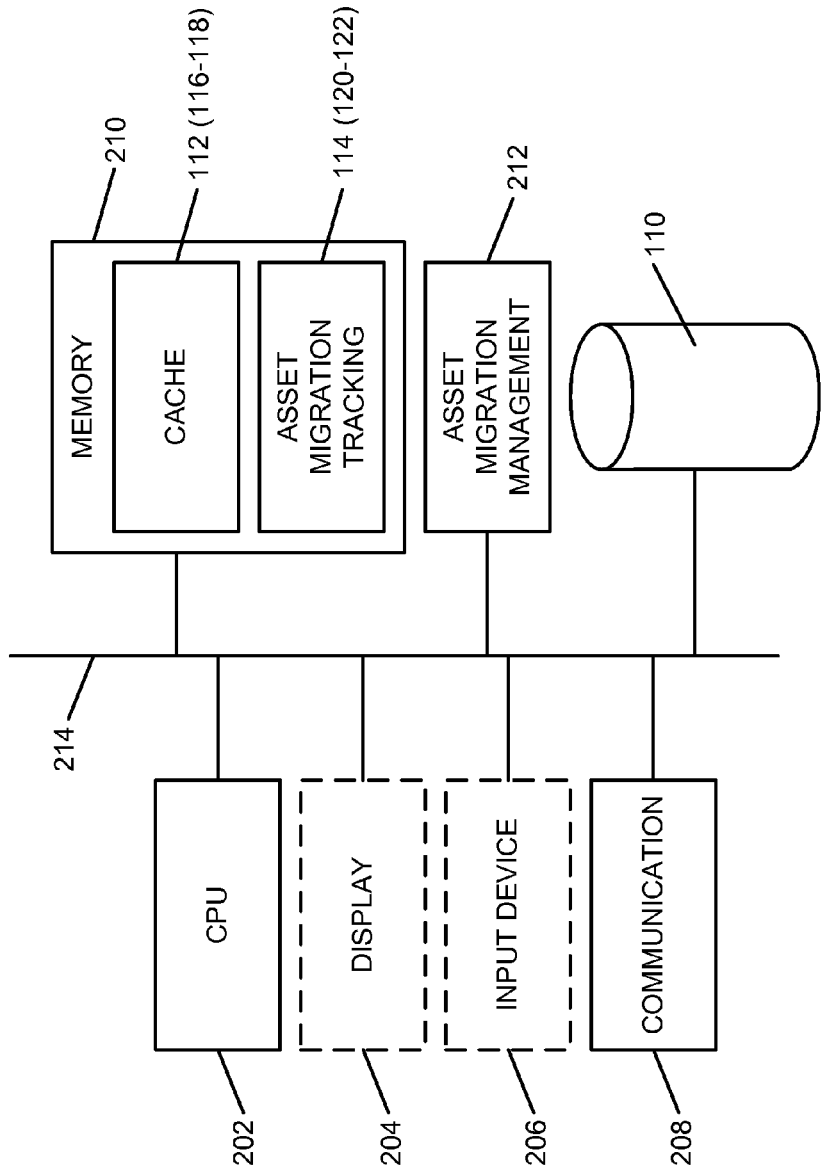
FIG. 2 is a block diagram of an example of an implementation of a core processing module capable of performing automated multi-level adaptive caching within asset-based web systems according to an embodiment of the present subject matter.

FIG. 2 is a block diagram of an example of an implementation of a core processing module 200 capable of performing automated multi-level adaptive caching within asset-based web systems. The core processing module 200 may be associated with any of the server 108 and the computing device_1 102 through the computing device_N 104, as appropriate for a given implementation and as further described in more detail below. Further, the core processing module 200 may provide different and complementary processing of adaptive multi-level caching based upon current data access characteristics associated with each implementation, as described in more detail below. A central processing unit (CPU) 202 provides computer instruction execution, computation, and other capabilities within the core processing module 200. A display 204 provides visual information to a user of the core processing module 200 and an input device 206 provides input capabilities for the user.

The display 204 may include any display device, such as a cathode ray tube (CRT), liquid crystal display (LCD), light emitting diode (LED), electronic ink displays, projection, touchscreen, or other display element or panel. The input device 206 may include a computer keyboard, a keypad, a mouse, a pen, a joystick, or any other type of input device by which the user may interact with and respond to information on the display 204.

It should be noted that the display 204 and the input device 206 are illustrated with a dashed-line representation within FIG. 2 to indicate that they may be optional components for the core processing module 200 for certain implementations. Accordingly, the core processing module 200 may operate as a completely automated embedded device without direct user configurability or feedback. However, the core processing module 200 may also provide user feedback and configurability via the display 204 and the input device 206, respectively.

A communication module 208 provides interconnection capabilities that allow the core processing module 200 to communicate with other modules within the system 100, such as the communications between the computing devices 102 through 104 and the server 108 for migration of asset data. The communication module 208 may include any electrical, protocol, and protocol conversion capabilities useable to provide the interconnection capabilities. Though the communication module 208 is illustrated as a component-level module for ease of illustration and description purposes, it should be noted that the communication module 208 may include any hardware, programmed processor(s), and memory used to carry out the functions of the communication module 208 as described above and in more detail below. For example, the communication module 208 may include additional controller circuitry in the form of application specific integrated circuits (ASICs), processors, antennas, and/or discrete integrated circuits and components for performing communication and electrical control activities associated with the communication module 208. Additionally, the communication module 208 may include interrupt-level, stack-level, and application-level modules as appropriate. Furthermore, the communication module 208 may include any memory components used for storage, execution, and data processing for performing processing activities associated with the communication module 208. The communication module 208 may also form a portion of other circuitry described without departure from the scope of the present subject matter.

A memory 210 includes the back-end cache 112 (for implementation of the core processing module 200 in association with the server 108) or one of the cache 116 through the cache 118 (as appropriate for implementation in association with any of the computing device_1 102 through the computing device_N 104). As described above the respective cache device (112, or 116 through 118) may store asset data in response to migration of the asset data to the respective device in association with which the respective cache is implemented. It should be noted that the respective cache devices (e.g., 112, and 116 through 118) may be different in size as appropriate for the given implementation. For example, the back-end cache 112 may be much larger than any of the cache 116 through 118 to allow the server 108 to manage multiple application assets and asset data sets for multiple client device sets.

The memory 210 also includes the asset migration tracking storage area 114 (or 120 through 122 for implementation in association with the respective computing device_1 102 through the computing device_N 104). For implementation within the server 108, the asset migration tracking storage area 114 is utilized to track distribution of asset data to one or more of the computing device_1 102 through the computing device_N 104, and to store and process migration policy information for determinations as to whether to migrate data between the respective devices. For implementation within one of the computing device_1 102 through the computing device_N 104, the asset migration tracking storage areas 120 through 122, respectively, may stored indicators (e.g., flags) or other information associated with processing migration instructions from the server 108. The respective asset migration tracking storage areas 114 and 120 through 122 may store asset ownership information, asset data migration events/triggers, information associated with migration of assets, or any other information as appropriate for a given implementation. Many other possibilities exist for storage of information in association with the automated multi-level adaptive caching within asset-based web systems described herein, and all are considered within the scope of the present subject matter.

It is understood that the memory 210 may include any combination of volatile and non-volatile memory suitable for the intended purpose, distributed or localized as appropriate, and may include other memory segments not illustrated within the present example for ease of illustration purposes. For example, the memory 210 may include a code storage area, an operating system storage area, a code execution area, and a data area without departure from the scope of the present subject matter.

An asset migration management module 212 is also illustrated. The asset migration management module 212 provides migration management functionality for the core processing module 200 when implemented in association with the server 108, and provides migration instruction processing functionality when implemented in association with one or more of the computing devices 102 through 104, as described above and in more detail below. The asset migration management module 212 implements the automated multi-level adaptive caching within asset-based web systems of the core processing module 200.

Though the asset migration management module 212 is illustrated as a component-level module for ease of illustration and description purposes, it should be noted that the asset migration management module 212 may include any hardware, programmed processor(s), and memory used to carry out the functions of this module as described above and in more detail below. For example, the asset migration management module 212 may include additional controller circuitry in the form of application specific integrated circuits (ASICs), processors, and/or discrete integrated circuits and components for performing communication and electrical control activities associated with the respective devices. Additionally, the asset migration management module 212 may include interrupt-level, stack-level, and application-level modules as appropriate. Furthermore, the asset migration management module 212 may include any memory components used for storage, execution, and data processing for performing processing activities associated with the module.

It should also be noted that the asset migration management module 212 may form a portion of other circuitry described without departure from the scope of the present subject matter. Further, the asset migration management module 212 may alternatively be implemented as an application stored within the memory 210. In such an implementation, the asset migration management module 212 may include instructions executed by the CPU 202 for performing the functionality described herein. The CPU 202 may execute these instructions to provide the processing capabilities described above and in more detail below for the core processing module 200. The asset migration management module 212 may form a portion of an interrupt service routine (ISR), a portion of an operating system, a portion of a browser application, or a portion of a separate application without departure from the scope of the present subject matter.

The database 110 is also shown associated with the core processing module 200 to show that it may be incorporated as a device that is integrated with the core process module 200 rather than a separate device as shown within FIG. 1. As described above, the database 110 stores asset data and may be considered a back-end data store for asset data.

The CPU 202, the display 204, the input device 206, the communication module 208, the memory 210, the asset migration management module 212, and the database 110 are interconnected via an interconnection 214. The interconnection 214 may include a system bus, a network, or any other interconnection capable of providing the respective components with suitable interconnection for the respective purpose.

While the core processing module 200 is illustrated with and has certain components described, other modules and components may be associated with the core processing module 200 without departure from the scope of the present subject matter. Additionally, it should be noted that, while the core processing module 200 is described as a single device for ease of illustration purposes, the components within the core processing module 200 may be co-located or distributed and interconnected via a network without departure from the scope of the present subject matter. For a distributed arrangement, the display 204 and the input device 206 may be located at a point of sale device, kiosk, office location, or other location, while the CPU 202 and memory 210 may be located at a local or remote server. Many other possible arrangements for components of the core processing module 200 are possible and all are considered within the scope of the present subject matter. It should also be understood that the information and asset data stored within the database 110 may alternatively be stored within the memory 210 without departure from the scope of the present subject matter. Accordingly, the core processing module 200 may take many forms and may be associated with many platforms.

FIG. 3 through FIG. 5C below describe example processes that may be executed by devices, such as the core processing module 200, to perform the automated multi-level adaptive caching within asset-based web systems associated with the present subject matter. Many other variations on the example processes are possible and all are considered within the scope of the present subject matter. The example processes may be performed by modules, such as the asset migration management module 212 and/or executed by the CPU 202, associated with such devices. It should be noted that time out procedures and other error control procedures are not illustrated within the example processes described below for ease of illustration purposes. However, it is understood that all such procedures are considered to be within the scope of the present subject matter.

Figure 3:
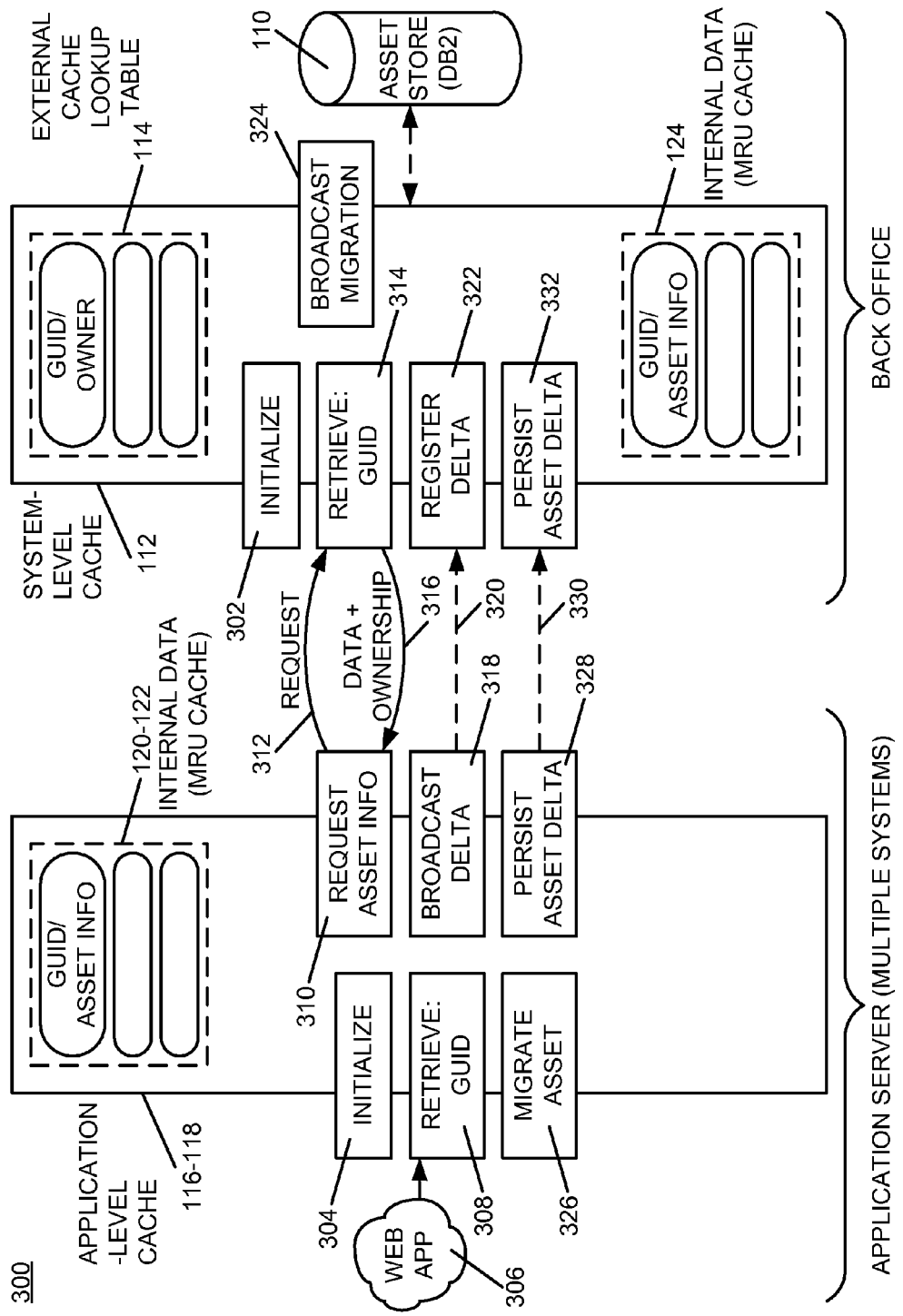
FIG. 3 is a logical flow diagram of an example of an implementation of a process flow based upon the system of FIG. 1 for automated multi-level adaptive caching within asset-based web systems according to an embodiment of the present subject matter.

FIG. 3 is a logical flow block diagram of an example of an implementation of a process flow 300 based upon the system 100 for automated multi-level adaptive caching within asset-based web systems. The computing device_1 102 through the computing device_N 104 are represented on the left of logical flow block diagram as an application server with multiple system instances, while the server 108 is represented on the right of the logical flow block diagram as a back office system. The cache 116 through 118 of the computing device_1 102 through the computing device_N 104 are shown as application level caches and to include internal data in the form of asset migration tracking storage area 120 through 122, each represented as most recently used (MRU) caches. The cache 112 of the server 108 is shown as a system-level cache and to include asset migration tracking storage area 114 represented as an external cache lookup table and an internal data area 124 represented as an MRU cache.

A global unique identifier (GUID) is used by each system to individually identify each asset that may be accessed by the respective client devices. As also described above, the server 108 tracks ownership of assets, while the respective client devices track asset information, including ownership if they are currently owners of a particular asset and asset data or alternatively if they are not currently identified as an owner of a particular asset and asset data.

It should be noted that the process flow 300 and the system 100 implement scalability by horizontal clustering. Web applications may run independently of each other within minimal communication. Each application has an internal application-level cache (e.g., the cache 116 through the cache 118). For purposes of the present example, the caches 116 through 118 are implemented as MRU caches with a designated/configured maximum size. Each view/download/change to an asset is broadcast to the server 108. The server 108 keeps track of which client device owns which external cache lookup table for the particular asset. Asset ownership collisions among web applications may result in the server 108 triggering an asset migration to the system-level cache 112. An asset that is accessed from/by one, and only one, web application will be migrated to the local cache of the respective client device. Assets that are pushed out of the respective application-level cache 116 through 118 or the server-level cache 112 have any changes written to the data store within the database 108. Within the present example, the database 108 is implemented using DB2®. The system-level cache 112 initialization forces the cache 112 to populate itself with the top "N" (a configurable number) popular assets to facilitate rapid access by requesting client devices. The top "N" popular assets may be configured and stored within a preload application asset list that may be accessed by the server 108 for preloading application asset data into a back-end cache, such as the system-level cache 112, to improve access speed for popular applications. Cache termination (or application termination) at a client device causes all pending changes to be written to the asset store/database. Asset information may include whether an asset is "dirty" (e.g., changed) or not. Though not shown within FIG. 3 to avoid crowding on the printed page, it is understood that the server 108 implements a web balancing layer that operates to cause client devices of similar users (e.g., same company, same area of expertise, etc.) to the same server 108. This web balancing layer may assist with improving efficiency by focusing management of particular applications and assets to a fewer number of servers (e.g., one).

As such, within the example of the process flow 300, at block 302, the server 108 initializes and populates its cache 112 with the configured top "N" application assets and asset data. At block 304, one or more of the computing devices 102 through 104 initialize. A web application 306 is started and the GUID for the web application 306 is retrieved at block 308. At block 310, the respective client device(s) request asset information from the server 108 using the GUID of the web application 306 via a Request 312. At block 314, the server 108 retrieves the asset data using the GUID and sends the asset data and ownership information to the respective client device(s) via a message 316.

For purposes of the present example, if only one of the computing device_1 102 through the computing device_N 104 requests the asset data, the server 108 will update its external cache lookup table for the respective asset to indicate that the single requesting client device is the owner of the particular asset. The ownership information sent to the requesting client device will include an indication that the single requesting client device is currently the owner of the respective asset. Alternatively, where more than one client device has requested the particular asset, the server 108 retains ownership of the asset and passes the asset data with the ownership information indicating that the server 108 has retained ownership.

Returning to the situation where a single client is identified to be requesting access to the asset data and has been assigned ownership of the asset data, the client device may make changes to the asset data within its application-level cache associated with the respective client device and may broadcast an asset data "delta" (e.g., asset data change) to the server 108 at block 318 via a message 320. The server 108 registers the asset data delta/change (e.g., updates asset data within the back-end cache) at block 322.

It should be noted that for an alternate situation/example where multiple client devices are accessing asset data stored in the server cache 112, and the server 108 is the owner of the asset data, each client device may broadcast asset data deltas to the server 108 to update the asset data stored within the cache 112 of the server 108. The server 108 may then send the asset data deltas to any other client device that is accessing the asset data. The respective client devices may update their local image of the asset data within their local application-level cache or may optionally not update their local image within their local application-level cache as appropriate for a given implementation. As such, each client device may be configured to operate with or without populating asset data deltas created by other client devices into their local asset data.

Continuing with the present example of a single client device that is initially accessing the asset data, it is assumed that a second client device initializes and requests asset data for the web application 306. In such a situation, the server 108 recognizes that ownership of the asset is assigned to another client device and initiates a migration of the asset data/ownership back to the server 108 and broadcasts a migration at block 324 (message itself not shown to avoid crowding within FIG. 3). In response to receipt of the migrate message, the client device updates its ownership information within its application-level cache to indicate that it is no longer the owner of the asset and initiates migration at block 326. To acknowledge completion of the ownership update, the client device initiates persistence of any asset data deltas initiated by the respective client device at block 328 via a message 330. In response to receiving the message 330, the server 108 persists the updated application asset data including the asset data delta/change to the database 108 at block 332. Many variations on the preceding example(s) are possible and all are considered within the scope of the present subject matter.

Figure 4:
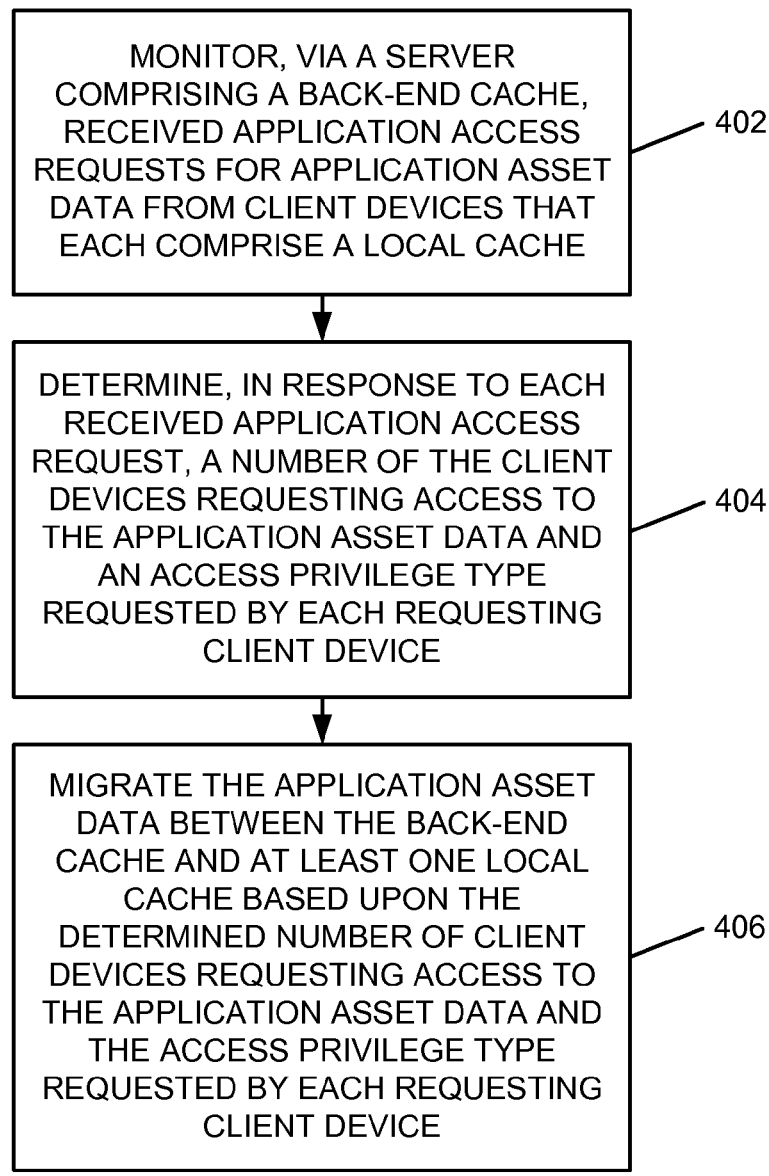
FIG. 4 is a flow chart of an example of an implementation of a process for automated multi-level adaptive caching within asset-based web systems according to an embodiment of the present subject matter.

FIG. 4 is a flow chart of an example of an implementation of a process 400 for automated multi-level adaptive caching within asset-based web systems. At block 402, the process 400 monitors, via a server comprising a back-end cache, received application access requests for application asset data from client devices that each comprise a local cache. At block 404, the process 400 determines, in response to each received application access request, a number of the client devices requesting access to the application asset data and an access privilege type requested by each requesting client device. At block 406, the process 400 migrates the application asset data between the back-end cache and at least one local cache based upon the determined number of client devices requesting access to the application asset data and the access privilege type requested by each requesting client device.

Figure 5A:
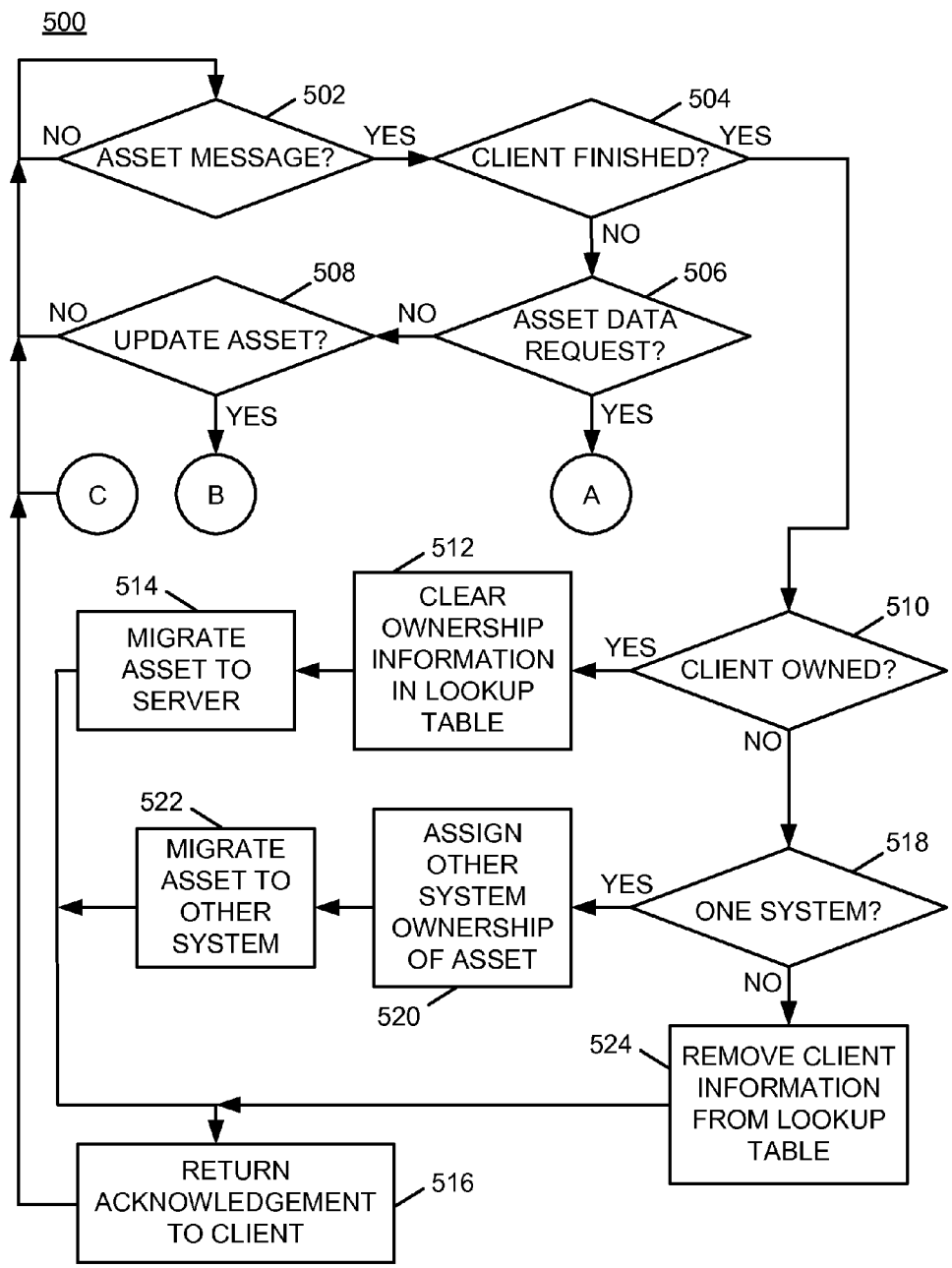
FIG. 5A is a flow chart of an example of an implementation of initial processing within a process for automated multi-level adaptive caching within asset-based web systems at a server device according to an embodiment of the present subject matter.
Figure 5B:
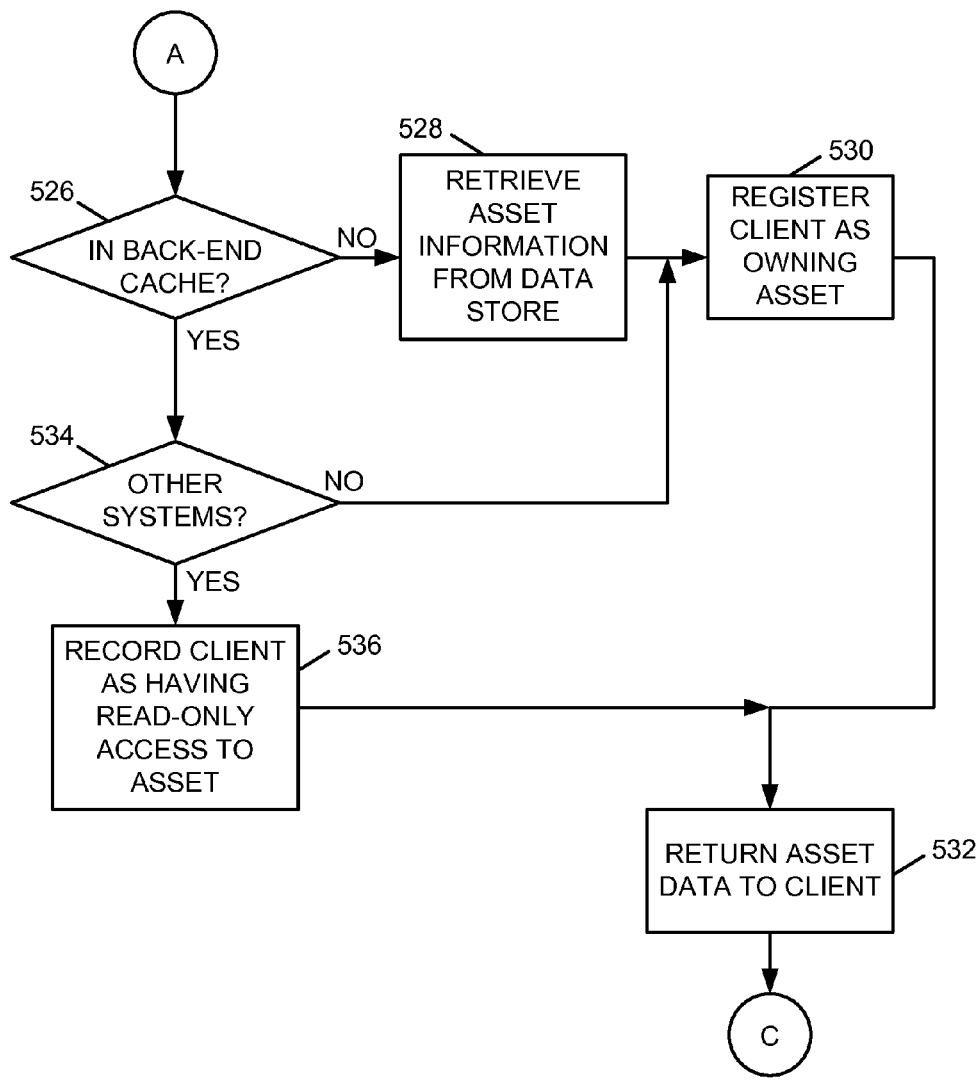
FIG. 5B is a flow chart of an example of an implementation of first additional processing within a process for automated multi-level adaptive caching within asset-based web systems at a server device according to an embodiment of the present subject matter.
Figure 5C:
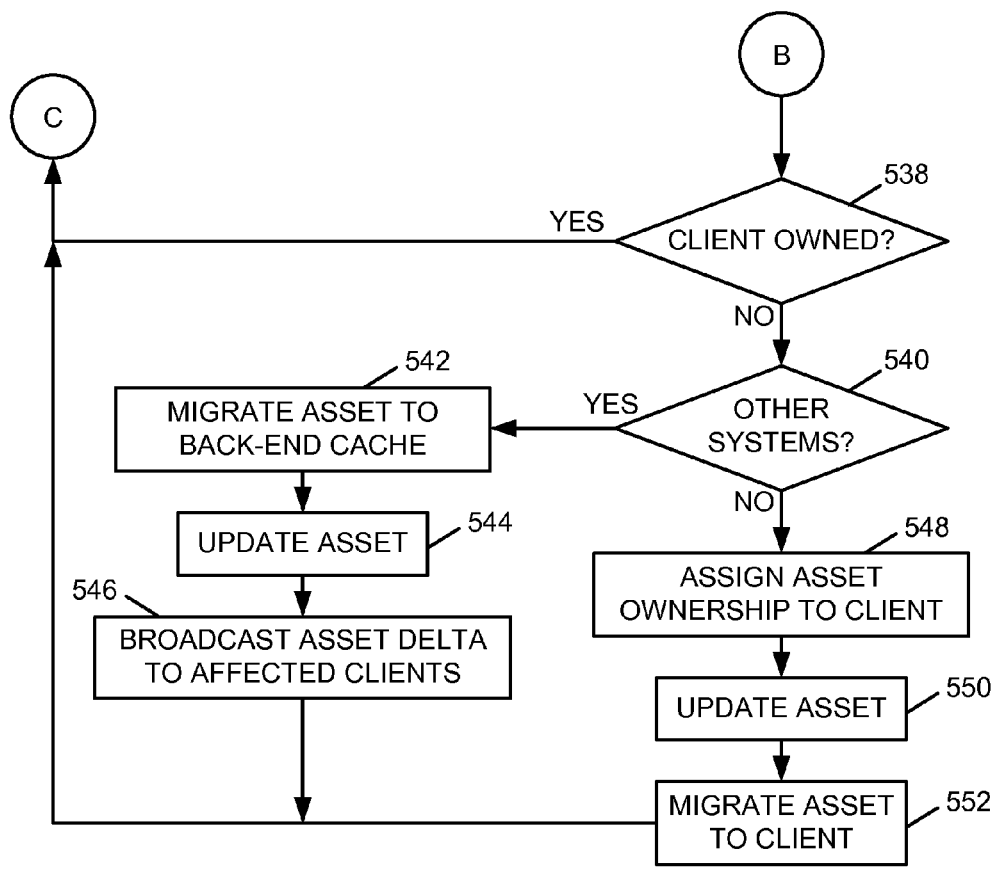
FIG. 5C is a flow chart of an example of an implementation of second additional processing within a process for automated multi-level adaptive caching within asset-based web systems at a server device according to an embodiment of the present subject matter.

FIGS. 5A-5C illustrate a flow chart of an example of an implementation of process 500 for automated multi-level adaptive caching within asset-based web systems at a server device, such as the server 108. It is understood that complementary processing for aspects of the process 500 may be performed at client devices, such as the computing device_1 102 through the computing device_N 104, to provide an interactive set of processes for implementation of the present subject matter. FIG. 5A illustrates initial processing within the process 500. At decision point 502, the process 500 begins higher-level iterative processing and makes a determination as to whether an asset information message from a client device has been detected/received. As described above, an asset message may include a request to access or terminate access to asset data and/or a request to update/modify asset data associated with an asset. An asset message may be received from client devices, such as the computing device_1 102 through the computing device_N 104. In response to determining that an asset message has been detected/received, the process 500 makes a determination as to whether the asset message is a message indicating that a client device is finished with an access to a particular item of asset data at decision point 504. For example, where a client device previously requested access to an asset, the client may be finished using the asset, and as such, ownership of the asset may be made available to other waiting client devices if the asset was owned by the client device that sent the asset message. Processing for an affirmative determination at decision point 504 will be deferred and described below.

In response to determining at decision point 504 that the asset is not a message indicating that a client device is finished with an access to a particular item of asset data, the process 500 makes a determination at decision point 506 as to whether the asset message includes a new asset data/asset information access request. Processing for an affirmative determination at decision point 506 will be deferred and described below.

In response to determining at decision point 506 that the asset message does not include a new asset data/asset information access request, the process 500 makes a determination at decision point 508 as to whether the asset message includes an asset update/write request. Again, processing for an affirmative determination at decision point 508 will be deferred and described below to complete the description of the higher-level iterative processing of the process 500. As such, in response to determining at decision point 508 that the asset message does not include an asset update request, the process 500 returns to decision point 502 and iterates as described above and in more detail below. For purposes of the present example, it is assumed that an affirmative determination may be made via at least one of decision point 504, decision point 506, and decision point 508, and the return from decision point 508 may be viewed as default processing to manage communication-level message corruption or other factors as appropriate for a given implementation.

Returning to the description of decision point 504, in response to determining that the asset message is a message indicating that a client device is finished with an access to a particular item of asset data, the process 500 makes a determination at decision point 510 as to whether the asset is currently owned by the client device that is relinquishing access to the asset data. As described above, ownership of an asset/asset data applies generally, with some exceptions as described below for access speed, to client devices that wish to edit the asset data. As such, if one or more client devices are accessing the asset data for read-only operations, no ownership is assigned. However, if two or more client devices wish to edit the same asset data, the asset data may be migrated to the back-end cache 112 associated with the server 108. Accordingly, in response to determining that the asset is currently owned by the client device that is relinquishing access to the asset data, the process 500 clears the ownership information associated with that client device within the lookup table at block 512. At block 514, the process 500 migrates the asset to the back-end cache of the server 108. As described above, migration of the asset to the back-end cache of the server 108 may include broadcasting a change of ownership message to the client device that was previously accessing the asset data and/or other client devices that may be waiting to take ownership of the asset data for editing. At block 516, the process 500 returns an acknowledgement to the requesting client device. The process 500 then returns to decision point 502 and iterates as described above.

Returning to the description of decision point 510, in response to determining that the asset is not currently owned by the client device that is relinquishing access to the asset data (e.g., no device is currently editing the asset data), the process 500 makes a determination at decision point 518 as to whether only one system is accessing the asset data for read-only operations or whether one other system is waiting to edit the asset data. In response to determining that only one system is accessing the asset data for read-only operations or that one other system is waiting to edit the asset data, the process 500 assigns ownership of the asset data to the other system that is accessing the asset data for read-only operations or the one other system that is waiting to edit the asset data at block 520. At block 522, the process 500 migrates the asset to the other system that has been assigned ownership of the asset data. It should be noted that the other system may already have a copy of the asset data for read-only operations, and as such the migration of the actual asset data may not be needed. Where one client device is accessing the asset data via network access with the data stored in the back-end cache 112, the asset data may be migrated to that client device to remove the network latency for access to the asset data. Additionally, where multiple client devices are accessing asset data for read-only operations, there is no need to keep the data in the back-end cache and the data may be migrated to the local cache of the respective client devices to remove network latency for data accesses. Further, once ownership has been assigned to a client device that is requesting read-only access, the client device may edit the asset data freely as the asset owner. The process 500 returns the acknowledgment to the requesting client device at block 516 and iterates as described above.

Returning to the description of decision point 518, in response to determining that no other system is accessing the asset data for read-only operations or that no other system is waiting to edit the asset data (and by reference that the client that has indicated that it is relinquishing access to the asset data as determined at decision point 510), the process 500 removes the client device information from the lookup table at block 524 and returns to block 516 and iterates as described above.

Returning to the description of decision point 506, in response to determining that the asset message includes a new asset data/asset information access request, the process 500 transitions to the processing shown and described in association with FIG. 5B.

FIG. 5B illustrates a first additional portion of processing associated with the process 500 for automated multi-level adaptive caching within asset-based web systems. At decision point 526, the process 500 makes a determination as to whether the asset data is in the back-end cache 112. In response to determining that the asset data is not in the back-end controller cache, the process 500 retrieves the asset data from the data store, such as the database 110, at block 528. At block 530, the process 500 registers the client as owning the asset. At block 532, the process 500 returns the asset data to the requesting client device and returns to decision point 502 described above in association with FIG. 5A and iterates as described above.

Returning to the description of decision point 526, in response to determining that the asset data is in the back-end cache 112, the process 500 makes a determination at decision point 534 as to whether any other systems are accessing the asset data. In response to determining that no other systems are accessing the asset data, the process 500 returns to block 530 to register the requesting device as the owner of the asset data and iterates as described above. In response to determining at decision point 534 that at least one other system is accessing the asset data, the process 500 records the requesting client as having read-only access to the asset data at block 536 and returns the asset data to the requesting client device at block 532 and iterates as described above in association with FIG. 5A.

Returning to the description of decision point 508 within FIG. 5A, in response to determining that the asset message includes an asset update/write request, the process 500 transitions to the processing shown and described in association with FIG. 5C.

FIG. 5C illustrates a second additional portion of processing associated with the process 500 for automated multi-level adaptive caching within asset-based web systems. At decision point 538, the process 500 makes a determination as to whether the client device requesting update of the asset data is the owner of the asset. If the client device that is requesting update of the asset data is the owner of the asset, the process 500 takes no action because the asset data may remain at the client device. This sequence may be considered a broadcast of the asset data "delta" described above in association with FIG. 3. It should be noted that the process 500 may alternatively update a version of the asset data stored within the back-end cache 112 as appropriate for a given implementation. The process 500 returns to decision point 502 described above in association with FIG. 5A.

In response to determining at decision point 538 that the requesting client device is not the current owner of the asset data, the process 500 makes a determination at decision point 540 as to whether one or more other client devices are accessing the asset data. If one or more other client devices are accessing the asset data, the process 500 migrates the asset data to the back-end cache 112 at block 542. At block 544, the process 500 updates the asset data. At block 546, the process 500 broadcasts an asset data delta/change to any affected client devices that are accessing the asset data. The process 500 returns to decision point 502 described above in association with FIG. 5A.

In response to determining at decision point 540 that no other client devices are accessing the asset data, the process 500 assigns ownership of the asset data to the requesting client device at block 548. At block 550, the process 500 updates the asset data. At block 552, the process 500 migrates the asset data to the requesting client device. The process 500 returns to decision point 502 described above in association with FIG. 5A.

As such, the process 500 provides for dynamic multi-level caching of asset data and migrates asset data between client device caches and a centralized back-end cache associated with a server device and an asset data store. The migration of the asset data between the respective multiple levels of caches allows the asset data to be accessed by client devices with reduced network latency based upon the access types (e.g., read access, write access, etc.) associated with one or more client devices, while preserving control of asset data updates and distribution of asset data deltas to affected client devices. The asset data may be migrated to client devices that are accessing the asset data for read-only operations or where only one client device is accessing the asset data to remove network latency for data accesses.

It is understood that each of the computing devices 102 through 104 performs complementary processing relative to the process 500. As such, the computing devices 102 through 104 may generate asset data requests including an access privilege type (e.g., read-only, read-write, or write access), respond to instructions to migrate asset data between the back-end cache 112 and the respective local cache 116 through 118, track its assigned ownership/migration status within the respective asset migration tracking storage areas 120 through 122, send update requests to the server 108, and respond to broadcasts of asset deltas/changes from the server 108. Many other possible interactions between the server 108 and the computing devices 102 through 104 are possible and all are considered within the scope of the present subject matter.

As described above in association with FIG. 1 through FIG. 5C, the example systems and processes provide automated multi-level adaptive caching within asset-based web systems. Many other variations and additional activities associated with multi-level adaptive caching within asset-based web systems are possible and all are considered within the scope of the present subject matter.

Those skilled in the art will recognize, upon consideration of the above teachings, that certain of the above examples are based upon use of a programmed processor, such as CPU 202. However, the invention is not limited to such example embodiments, since other embodiments could be implemented using hardware component equivalents such as special purpose hardware and/or dedicated processors. Similarly, general purpose computers, microprocessor based computers, micro-controllers, optical computers, analog computers, dedicated processors, application specific circuits and/or dedicated hard wired logic may be used to construct alternative equivalent embodiments.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as JAVA®, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention have been described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable storage medium that can direct a computer or other programmable data processing apparatus to function in a particular manner, such that the instructions stored in the computer-readable storage medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modems and Ethernet cards are just a few of the currently available types of network adapters.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method, comprising:
monitoring, via a server comprising a back-end cache, received application access requests for application asset data from client devices that each comprise a local cache;
determining, in response to each received application access request, a number of the client devices requesting access to the application asset data and an access privilege type requested by each requesting client device, where the access privilege type comprises one of a read-only access privilege type and a write-access privilege type; and
migrating the application asset data between the back-end cache and at least one local cache based upon the determined number of client devices requesting access to the application asset data and the access privilege type requested by each requesting client device.

2. The method of claim 1, where:
monitoring, via the server comprising the back-end cache, the received application access requests for the application asset data from the client devices that each comprise the local cache comprises receiving a first application access request comprising the write-access privilege type from a first client device;
determining, in response to each received application access request, the number of client devices requesting access to the application asset data and the access privilege type requested by each requesting client device comprises determining that the number of client devices requesting access to the application asset data comprises one client device and that the access privilege type requested by the first client device comprises the write-access privilege type; and
migrating the application asset data between the back-end cache and the at least one local cache based upon the determined number of client devices requesting access to the application asset data and the access privilege type requested by each requesting client device comprises:
assigning ownership of the application asset data to the first client device; and
sending the application asset data from the back-end cache of the server to the local cache of the first client device based upon determining that the number of client devices requesting access to the application asset data comprises one client device and determining that the access privilege type requested by the first client device comprises the write-access privilege type.

3. The method of claim 2, where:
monitoring, via the server comprising the back-end cache, the received application access requests for the application asset data from the client devices that each comprise the local cache comprises receiving a second application access request comprising the write-access privilege type from a second client device;
determining, in response to each received application access request, the number of client devices requesting access to the application asset data and the access privilege type requested by each requesting client device comprises determining that the number of client devices requesting access to the application asset data comprises two client devices and that the access privilege type requested by each of the first client device and the second client device comprises the write-access privilege type; and
migrating the application asset data between the back-end cache and the at least one local cache based upon the determined number of client devices requesting access to the application asset data and the access privilege type requested by each requesting client device comprises:
assigning ownership of the application asset data to the server; and
sending the application asset data from the local cache of the first client device to the back-end cache of the server in response to determining that the number of client devices requesting access to the application asset data comprises two client devices and determining that the access privilege type requested by each of the first client device and the second client device comprises the write-access privilege type.

4. The method of claim 2, where assigning ownership of the application asset data to the first client device comprises assigning ownership of the application asset data to the first client device within an application access lookup table maintained by the server within the back-end cache.

5. The method of claim 1, where:
monitoring, via the server comprising the back-end cache, the received application access requests for the application asset data from the client devices that each comprise the local cache comprises receiving at least two application access requests each comprising the read-only access privilege type from at least two client devices;
determining, in response to each received application access request, the number of client devices requesting access to the application asset data and the access privilege type requested by each requesting client device comprises determining that the number of client devices requesting access to the application asset data comprises the at least two client devices and that the access privilege type requested by the at least two client devices comprises the read-only access privilege type; and migrating the application asset data between the back-end cache and the at least one local cache based upon the determined number of client devices requesting access to the application asset data and the access privilege type requested by each requesting client device comprises:
- maintaining ownership of the application asset data by the server; and
- sending the application asset data to the local cache of the at least two client devices in response to determining that the number of client devices requesting access to the application asset data comprises the at least two client devices and that the access privilege type requested by the at least two client devices comprises the read-only access request type.

6. The method of claim 5, where:

monitoring, via the server comprising the back-end cache, the received application access requests for the application asset data from the client devices that each comprise the local cache comprises receiving an additional application access request comprising the write-access privilege type from an additional client device;

determining, in response to each received application access request, the number of client devices requesting access to the application asset data and the access privilege type requested by each requesting client device comprises determining that the number of client devices requesting access to the application asset data comprises multiple client devices and that the access privilege type requested by at least one of the multiple client devices comprises the write-access privilege type; and migrating the application asset data between the back-end cache and the at least one local cache based upon the determined number of client devices requesting access to the application asset data and the access privilege type requested by each requesting client device comprises:
- maintaining ownership of the application asset data by the server; and
- instructing each of the at least two client devices and the additional client device to access the application asset data within the back-end cache of the server in response to determining that the number of client devices requesting access to the application asset data comprises the multiple client devices and that the access privilege type requested by the at least one of the multiple client devices comprises the write-access privilege type.

7. The method of claim 6, where monitoring, via the server comprising the back-end cache, the received application access requests for the application asset data from the client devices that each comprise the local cache comprises receiving an application asset data change from the additional client device, and further comprising:
- updating the application asset data stored within the back-end cache of the server with the application asset data change; and
- persisting the updated application asset data to a database.

8. The method of claim 7, further comprising broadcasting the application asset data change to the at least two client devices from which the at least two application access data requests, each comprising the read-only access privilege type, were received.

9. A server apparatus, comprising:
- a back-end cache; and
- a processor programmed to:
  - monitor received application access requests for application asset data from client devices that each comprise a local cache;
  - determine, in response to each received application access request, a number of the client devices requesting access to the application asset data and an access privilege type requested by each requesting client device, where the access privilege type comprises one of a read-only access privilege type and a write-access privilege type; and
  - migrate the application asset data between the back-end cache and at least one local cache based upon the determined number of client devices requesting access to the application asset data and the access privilege type requested by each requesting client device.

10. The server apparatus of claim 9, where, in being programmed to:
- monitor the received application access requests for the application asset data from the client devices that each comprise the local cache, the processor is programmed to receive a first application access request comprising the write-access privilege type from a first client device;
- determine, in response to each received application access request, the number of client devices requesting access to the application asset data and the access privilege type requested by each requesting client device, the processor is programmed to determine that the number of client devices requesting access to the application asset data comprises one client device and that the access privilege type requested by the first client device comprises the write-access privilege type; and
- migrate the application asset data between the back-end cache and the at least one local cache based upon the determined number of client devices requesting access to the application asset data and the access privilege type requested by each requesting client device, the processor is programmed to:
  - assign ownership of the application asset data to the first client device; and
  - send the application asset data from the back-end cache to the local cache of the first client device based upon determining that the number of client devices requesting access to the application asset data comprises one client device and determining that the access privilege type requested by the first client device comprises the write-access privilege type.

11. The server apparatus of claim 10, where, in being programmed to:
- monitor the received application access requests for the application asset data from the client devices that each comprise the local cache, the processor is programmed to receive a second application access request comprising the write-access privilege type from a second client device;
- determine, in response to each received application access request, the number of client devices requesting access to the application asset data and the access privilege type requested by each requesting client device, the processor is programmed to determine that the number of client devices requesting access to the application asset data comprises two client devices and that the access privilege type requested by each of the first client device and the second client device comprises the write-access privilege type; and
- migrate the application asset data between the back-end cache and the at least one local cache based upon the determined number of client devices requesting access to the application asset data and the access privilege type requested by each requesting client device, the processor is programmed to:
  assign ownership of the application asset data to the server apparatus; and
  send the application asset data from the local cache of the first client device to the back-end cache in response to determining that the number of client devices requesting access to the application asset data comprises two client devices and determining that the access privilege type requested by each of the first client device and the second client device comprises the write-access privilege type.

12. The server apparatus of claim 10, where, in being programmed to assign ownership of the application asset data to the first client device, the processor is programmed to assign ownership of the application asset data to the first client device within an application access lookup table maintained within the back-end cache.

13. The server apparatus of claim 9, where, in being programmed to:
  monitor the received application access requests for the application asset data from the client devices that each comprise the local cache, the processor is programmed to receive at least two application access requests each comprising the read-only access privilege type from at least two client devices;
  determine, in response to each received application access request, the number of client devices requesting access to the application asset data and the access privilege type requested by each requesting client device, the processor is programmed to determine that the number of client devices requesting access to the application asset data comprises the at least two client devices and that the access privilege type requested by the at least two client devices comprises the read-only access privilege type; and
  migrate the application asset data between the back-end cache and the at least one local cache based upon the determined number of client devices requesting access to the application asset data and the access privilege type requested by each requesting client device, the processor is programmed to:
    maintain ownership of the application asset data; and
    send the application asset data to the at least two client devices in response to determining that the number of client devices requesting access to the application asset data comprises the at least two client devices and that the access privilege type requested by the at least two client devices comprises the read-only access request type.

14. The server apparatus of claim 13, where, in being programmed to:
  monitor the received application access requests for the application asset data from the client devices that each comprise the local cache, the processor is programmed to receive an additional application access request comprising the write-access privilege type from an additional client device;
  determine, in response to each received application access request, the number of client devices requesting access to the application asset data and the access privilege type requested by each requesting client device, the processor is programmed to determine that the number of client devices requesting access to the application asset data comprises multiple client devices and that the access privilege type requested by at least one of the multiple client devices comprises the write-access privilege type; and
  migrate the application asset data between the back-end cache and the at least one local cache based upon the determined number of client devices requesting access to the application asset data and the access privilege type requested by each requesting client device, the processor is programmed to:
    maintain ownership of the application asset data; and
    instruct each of the at least two client devices and the additional client device to access the application asset data within the back-end cache in response to determining that the number of client devices requesting access to the application asset data comprises the multiple client devices and that the access privilege type requested by the at least one of the multiple client devices comprises the write-access privilege type.

15. The server apparatus of claim 14, further comprising a database; and
  where, in being programmed to monitor the received application access requests for the application asset data from the client devices that each comprise the local cache, the processor is programmed to receive an application asset data change from the additional client device, and the processor is further programmed to:
    update the application asset data stored within the back-end cache with the application asset data change; and
    persist the updated application asset data to a database.

16. The server apparatus of claim 15, where the processor is further programmed to broadcast the application asset data change to the at least two client devices from which the at least two application access data requests, each comprising the read-only access privilege type, were received.

17. A computer program product comprising a computer readable storage device including computer readable program code, where the computer readable program code when executed on a computer causes the computer to:
  monitor, via a server comprising a back-end cache, received application access requests for application asset data from client devices that each comprise a local cache;
  determine, in response to each received application access request, a number of the client devices requesting access to the application asset data and an access privilege type requested by each requesting client device, where the access privilege type comprises one of a read-only access privilege type and a write-access privilege type; and
  migrate the application asset data between the back-end cache and at least one local cache based upon the determined number of client devices requesting access to the application asset data and the access privilege type requested by each requesting client device.

18. The computer program product of claim 17, where, in causing the computer to:
  monitor, via the server comprising the back-end cache, the received application access requests for the application asset data from the client devices that each comprise the local cache, the computer readable program code when executed on the computer causes the computer to receive a first application access request comprising the write-access privilege type from a first client device;
  determine, in response to each received application access request, the number of client devices requesting access to the application asset data and the access privilege type requested by each requesting client device, the computer readable program code when executed on the computer causes the computer to determine that the number of client devices requesting access to the application asset data comprises one client device and that the access privilege type requested by the first client device comprises the write-access privilege type; and migrate the application asset data between the back-end cache and the at least one local cache based upon the determined number of client devices requesting access to the application asset data and the access privilege type requested by each requesting client device, the computer readable program code when executed on the computer causes the computer to:

assign ownership of the application asset data to the first client device; and send the application asset data from the back-end cache of the server to the local cache of the first client device based upon determining that the number of client devices requesting access to the application asset data comprises one client device and determining that the access privilege type requested by the first client device comprises the write-access privilege type.

19. The computer program product of claim 18, where, in causing the computer to:

monitor, via the server comprising the back-end cache, the received application access requests for the application asset data from the client devices that each comprise the local cache, the computer readable program code when executed on the computer causes the computer to receive a second application access request comprising the write-access privilege type from a second client device;

determine, in response to each received application access request, the number of client devices requesting access to the application asset data and the access privilege type requested by each requesting client device, the computer readable program code when executed on the computer causes the computer to determine that the number of client devices requesting access to the application asset data comprises two client devices and that the access privilege type requested by each of the first client device and the second client device comprises the write-access privilege type; and migrate the application asset data between the back-end cache and the at least one local cache based upon the determined number of client devices requesting access to the application asset data and the access privilege type requested by each requesting client device, the computer readable program code when executed on the computer causes the computer to:

assign ownership of the application asset data to the server; and send the application asset data from the local cache of the first client device to the back-end cache of the server in response to determining that the number of client devices requesting access to the application asset data comprises two client devices and determining that the access privilege type requested by each of the first client device and the second client device comprises the write-access privilege type.

20. The computer program product of claim 18, where, in causing the computer to assign ownership of the application asset data to the first client device, the computer readable program code when executed on the computer causes the computer to assign ownership of the application asset data to the first client device within an application access lookup table maintained by the server within the back-end cache.

21. The computer program product of claim 17, where, in causing the computer to:

monitor, via the server comprising the back-end cache, the received application access requests for the application asset data from the client devices that each comprise the local cache, the computer readable program code when executed on the computer causes the computer to receive at least two application access requests each comprising the read-only access privilege type from at least two client devices;

determine, in response to each received application access request, the number of client devices requesting access to the application asset data and the access privilege type requested by each requesting client device, the computer readable program code when executed on the computer causes the computer to determine that the number of client devices requesting access to the application asset data comprises the at least two client devices and that the access privilege type requested by the at least two client devices comprises the read-only access privilege type; and migrate the application asset data between the back-end cache and the at least one local cache based upon the determined number of client devices requesting access to the application asset data and the access privilege type requested by each requesting client device, the computer readable program code when executed on the computer causes the computer to:

maintain ownership of the application asset data by the server; and send the application asset data to the local cache of the at least two client devices in response to determining that the number of client devices requesting access to the application asset data comprises the at least two client devices and that the access privilege type requested by the at least two client devices comprises the read-only access request type.

22. The computer program product of claim 21, where, in causing the computer to:

monitor, via the server comprising the back-end cache, the received application access requests for the application asset data from the client devices that each comprise the local cache, the computer readable program code when executed on the computer causes the computer to receive an additional application access request comprising the write-access privilege type from an additional client device;

determine, in response to each received application access request, the number of client devices requesting access to the application asset data and the access privilege type requested by each requesting client device, the computer readable program code when executed on the computer causes the computer to determine that the number of client devices requesting access to the application asset data comprises multiple client devices and that the access privilege type requested by at least one of the multiple client devices comprises the write-access privilege type; and migrate the application asset data between the back-end cache and the at least one local cache based upon the determined number of client devices requesting access to the application asset data and the access privilege type requested by each requesting client device, the computer readable program code when executed on the computer causes the computer to:

maintain ownership of the application asset data by the server; and instruct each of the at least two client devices and the additional client device to access the application asset data within the back-end cache of the server in response to determining that the number of client devices requesting access to the application asset data comprises the multiple client devices and that the access privilege type requested by the at least one of the multiple client devices comprises the write-access privilege type.

23. The computer program product of claim 22, where, in causing the computer to monitor, via the server comprising the back-end cache, the received application access requests for the application asset data from the client devices that each comprise the local cache, the computer readable program code when executed on the computer causes the computer to receive an application asset data change from the additional client device, and the computer readable program code when executed on the computer further causes the computer to:

update the application asset data stored within the back-end cache of the server with the application asset data change; and persist the updated application asset data to a database.

24. The computer program product of claim 23, where the computer readable program code when executed on the computer further causes the computer to broadcast the application asset data change to the at least two client devices from which the at least two application access data requests, each comprising the read-only access privilege type, were received.

* * * * *